US010897033B2

(12) United States Patent
Lee et al.

(10) Patent No.: US 10,897,033 B2
(45) Date of Patent: Jan. 19, 2021

(54) BATTERY PACK FOR ELECTRIC POWER STORAGE DEVICE

(71) Applicant: LG CHEM, LTD., Seoul (KR)

(72) Inventors: Bum Hyun Lee, Daejeon (KR); Jungil Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 330 days.

(21) Appl. No.: 14/908,848

(22) PCT Filed: Aug. 14, 2014

(86) PCT No.: PCT/KR2014/007570
§ 371 (c)(1),
(2) Date: Jan. 29, 2016

(87) PCT Pub. No.: WO2015/026103
PCT Pub. Date: Feb. 26, 2015

(65) Prior Publication Data
US 2016/0164053 A1 Jun. 9, 2016

(30) Foreign Application Priority Data
Aug. 23, 2013 (KR) .......................... 10-2013-0100152

(51) Int. Cl.
*H01M 10/0525* (2010.01)
*H01M 2/10* (2006.01)
(Continued)

(52) U.S. Cl.
CPC ......... *H01M 2/1077* (2013.01); *H01M 2/206* (2013.01); *H01M 10/0525* (2013.01);
(Continued)

(58) Field of Classification Search
CPC .......... H01M 2/0237–0245; H01M 2/10–1083
See application file for complete search history.

(56) References Cited

U.S. PATENT DOCUMENTS

| 2007/0080662 A1* | 4/2007 | Wu ........................ B60L 3/0046 |
| | | 320/110 |
| 2010/0297482 A1* | 11/2010 | Yoon ....................... H01M 2/34 |
| | | 429/61 |

(Continued)

FOREIGN PATENT DOCUMENTS

| JP | 7-69078 A | 3/1995 |
| JP | 2004-161054 A | 6/2004 |

(Continued)

OTHER PUBLICATIONS

Machine Translation of KR 10-2009-0000297 from EPO originally published to Yang et al. on Jan. 7, 2009.*

(Continued)

*Primary Examiner* — James Lee
(74) *Attorney, Agent, or Firm* — Birch, Stewart, Kolasch & Birch, LLP (57) ABSTRACT

Disclosed herein is a battery pack configured to have a structure including at least one module assembly configured to have a structure in which battery modules, each of which has a structure in which a plurality of unit cells is stacked in a state in which unit cells are electrically connected to each other, are arranged such that the battery modules are adjacent to each other, a pair of side plates coupled to each other for covering opposite sides of the module assembly, a base plate having fastening parts, which are coupled to the side plates, formed at one surface thereof and an external mounting part, which is mounted to an external structure, formed at the other surface thereof, and a sheathing cover coupled to the base plate while covering the module assembly.

23 Claims, 8 Drawing Sheets

(51) Int. Cl.
    *H01M 2/20* (2006.01)
    *H01M 10/42* (2006.01)
(52) U.S. Cl.
    CPC .. *H01M 10/425* (2013.01); *H01M 2010/4271* (2013.01); *H01M 2220/10* (2013.01); *H01M 2220/20* (2013.01)

(56) References Cited

U.S. PATENT DOCUMENTS

| | | | | |
|---|---|---|---|---|
| 2011/0020677 | A1* | 1/2011 | Shin | H01M 2/0277 429/71 |
| 2011/0135994 | A1* | 6/2011 | Yang | H01M 2/0212 429/159 |
| 2011/0200862 | A1 | 8/2011 | Kurosawa | |
| 2012/0208069 | A1 | 8/2012 | Kim | |
| 2014/0072835 | A1* | 3/2014 | Tsujimura | H01M 2/1072 429/7 |

FOREIGN PATENT DOCUMENTS

| | | |
|---|---|---|
| JP | 2006-185894 A | 7/2006 |
| JP | 2008-184015 A | 8/2008 |
| JP | 2008-277058 A | 11/2008 |
| JP | 2010-531535 A | 9/2010 |
| JP | 2011-40203 A | 2/2011 |
| JP | 2011-126396 A | 6/2011 |
| JP | 2011-171029 A | 9/2011 |
| JP | 2012-94456 A | 5/2012 |
| JP | 2012-243449 A | 12/2012 |
| JP | 2014-154831 A | 8/2014 |
| JP | 5968375 B2 | 7/2016 |
| KR | 19980048252 A * | 9/1998 |
| KR | 10-2009-0000297 A | 1/2009 |
| KR | 10-2011-0062687 A | 6/2011 |
| KR | 10-2012-0054807 A | 5/2012 |
| KR | 10-2012-0093646 A | 8/2012 |
| KR | 10-2013-0017129 A | 2/2013 |
| WO | WO-0079635 A1 * | 12/2000 ........ H01M 10/4257 |
| WO | WO 2012/057489 A2 | 5/2012 |
| WO | WO 2012/070782 A2 | 5/2012 |
| WO | WO 2013/089470 A1 | 6/2013 |
| WO | WO 2013/103211 A1 | 7/2013 |

OTHER PUBLICATIONS

Google Patents Machine translation of KR19980048252A originally published to Park on Sep. 15, 1998 (Year: 1998).*
International Search Report, issued in PCT/KR2014/007570, dated Dec. 15, 2014.

\* cited by examiner

BATTERY PACK FOR ELECTRIC POWER STORAGE DEVICE

TECHNICAL FIELD

The present invention relates to a battery pack for electric power storage devices.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to an electric power storage device that stores electric power and stably supplies the stored electric power to a power system when needed has been developed. The electric power storage device is a device that stores electric power when electric power demand is low and supplies the stored electric power in case of overload or emergency. The electric power storage device provides the effect of improving quality of electric power and energy efficiency. In particular, a market for a household electric power storage device and a middle-sized industrial or commercial electric power storage device has been rapidly expanding as the electric power storage devices are related to smart grid technology.

Meanwhile, in order for a battery pack to provide output and capacity required by a predetermined apparatus or device, it is necessary for the battery module to be configured to have a structure in which a plurality of battery cells or a plurality of battery modules, each of which includes a plurality of battery cells, is electrically connected to each other in series or in parallel. In addition, it is necessary for the battery pack to be configured to have a structure that is easily extendable and stable as the capacity of the battery pack is increased.

In addition, in a case in which a plurality of battery cells is used to constitute a battery pack, a plurality of members, such as bus bars and power cables, is needed for mechanical fastening and electrical connection between the battery cells, and a process of assembling the members is very complicated. In addition, in a case in which it is necessary to extend the battery pack, it is difficult to modify the structure of the battery pack. Furthermore, a plurality of components is additionally needed, which increases cost of manufacturing the battery pack.

Furthermore, the battery pack may be deteriorated, may be short-circuited, and may explode due to expansion and contraction of the battery cells caused due to repetitive charge and discharge of the battery cells and due to malfunction of the battery ells. Moreover, since the battery pack is assembled using a plurality of components, interference between the components and wires, electric leakages from the components and the wires, and short circuits in the components and the wires may occur due to the complicated structure in the battery pack. For these reasons, structural stability of the battery pack is further required.

Meanwhile, it is necessary for a battery pack for household or emergency electric power storage devices to be configured to have a structure that is capable of being movable when needed or easily being separately mounted to a specific place.

Therefore, there is a high necessity for technology that is capable of solving the above problems and technical demands.

DISCLOSURE

Technical Problem

The present invention has been made to solve the above problems and other technical problems that have yet to be resolved.

It is an object of the present invention to provide a battery pack that can be easily assembled, is generally compact, and exhibits high structural stability.

It is another object of the present invention to provide a battery pack configured to have a structure that can be easily separately mounted to an external structure or an external device and exhibits improved mobility.

Technical Solution

In accordance with one aspect of the present invention, the above and other objects can be accomplished by the provision of a battery pack configured to have a structure including (a) at least one module assembly configured to have a structure in which battery modules, each of which has a structure in which a plurality of unit cells is stacked in a state in which unit cells are electrically connected to each other, are arranged such that the battery modules are adjacent to each other, (b) a pair of side plates coupled to each other for covering opposite sides of the module assembly, (c) a base plate having fastening parts, which are coupled to the side plates, formed at one surface thereof and an external mounting part, which is mounted to an external structure, formed at the other surface thereof, and (d) a sheathing cover coupled to the base plate while covering the module assembly.

That is, the battery pack according to the present invention is configured to have a structure in which at least one module assembly, constituted by a plurality of battery modules which are coupled to each other, is mounted on a base plate in a state in which side plates are coupled to the module assembly. Consequently, it is possible to stably mount the battery modules in the battery pack and to easily assemble the battery pack.

In addition, the battery pack according to the present invention includes an external mounting part. Consequently, it is possible to easily mount the battery pack to an external structure In a concrete example, each of the unit cells may be a single plate-shaped battery cell, or may be a battery cell assembly configured to have a structure in which two or more plate-shaped battery cells are mounted in a cell cover in a state in which electrode terminals are exposed.

For example, the plate-shaped battery cell may be a pouch-shaped battery cell configured to have a structure in which an electrode assembly is mounted in a battery case made of a laminate sheet including a metal layer and a resin layer.

Specifically, the battery cell may be a pouch-shaped battery cell configured to have a structure in which an electrode assembly of a positive electrode/separator/negative electrode structure is contained in a battery case together with an electrolyte in a sealed state. The battery cell may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, the battery case may be configured to have a structure in which an electrode assembly is received in a receiving part formed at an upper inner surface and/or a lower inner surface of a one-unit member, and the upper and lower contact regions of the outer edge of the battery case are sealed by thermal bonding.

The battery cell is not particularly restricted so long as the battery cell is capable of providing high voltage and high current when a battery module or a battery pack is constituted using the battery cell. For example, the battery cell may be a lithium secondary battery having a large amount of energy storage per volume.

In a concrete example, each of the battery modules may be configured to have a structure in which two or more unit cells are stacked, in a state in which each of the unit cells is mounted to a corresponding cartridge, to form a unit cell stack structure, and an upper plate and a lower plate are mounted to the outermost unit cells of the unit cell stack structure for fixing the unit cell stack structure. For example, each of the cartridges, which form the unit cell stack structure, may be provided with fastening holes, and fastening members are fixed to the upper and lower plates through the fastening holes such that the unit cell stack structure can be fixed between the upper and lower plates.

Meanwhile, each of the side plates may be provided with two or more battery module coupling parts, which extend from an upper end of each of the side plates and are bent so as to contact the top surfaces of the battery modules, for fixing the battery modules. Each of the battery module coupling parts may be provided with a fastening hole, through which each of the battery module coupling parts is coupled to a corresponding upper corner of a corresponding one of the battery modules. Bolts or rivets may be inserted through the fastening holes such that battery module coupling parts are coupled to the battery modules.

The number of the battery modules included in the module assembly is not particularly restricted. One or more battery modules may be arranged in a state of being electrically connected to each other based on desired output or capacity. For example, the module assembly may be configured to have a structure in which two battery modules are arranged in a state in which the battery modules are adjacent to each other laterally with respect to a direction in which the unit cells are stacked.

Meanwhile, a conventional battery pack includes a complicated wiring structure therein. In such a complicated wiring structure, the battery pack may malfunction due to interference or noise.

The battery pack according to the present invention may be configured to have a structure including a power harness for interconnecting the battery modules and a communication wire harness that is connected to a controller for controlling the operation of the battery pack, and the power wire harness and the communication wire harness are spaced apart from each other to prevent the occurrence of the above-mentioned problems.

In a concrete example, data that are transmitted through the communication wire harness may be damaged due to noise generated in a case in which the communication wire harness is adjacent to the power wire harness, which is connected to input and output terminals of the battery modules, with the result that the battery pack may malfunction. In order to solve this problem, any one selected from between the power wire harness and the communication wire harness is mounted along the outer surface of a corresponding one of the side plates such that the power wire harness and the communication wire harness are spaced apart from each other.

In a more concrete example, the power wire harness may be mounted along the outer surface of one of the side plates, and the communication wire harness may be mounted along the outer surface of the other side plate, in order to prevent malfunction of the battery pack.

The power wire harness may include a power line for interconnecting the battery modules and a sensing line for transmitting voltages detected from the battery modules.

A three polar power connector, which is connected to a positive electrode, a negative electrode, and a ground wire, may be electrically connected to the battery modules, and the power connector may be connected to the end of the power line. The end of the ground wire may contact the base plate for grounding in order to prevent the occurrence of an electric leakage and to prevent noise from being generated in the communication wire harness.

The ground wire may contact the top surface of the base plate adjacent to the outer surface of the side plate at which the power wire harness is located. However, the present invention is not limited thereto. For example, the ground wire may contact any region so long as the region is spaced apart or isolated from the communication wire harness in order to prevent noise from being generated in the communication wire harness.

The communication wire harness may connect an inverter, which is connected to an input and output terminal of the battery pack, to a battery management system (BMS), which functions as the controller.

The base plate and/or the sheathing cover may be provided at the outer surface thereof with a reinforcement bead having a concave and convex structure for improving rigidity of the base plate and/or the sheathing cover.

In addition, the base plate may be provided with an air hole communicating with the outside such that heat generated from the battery modules is discharged through the air hole.

Meanwhile, the sheathing cover of the battery pack may be provided at one side or each side thereof with a handle for transportation, which enables easy transportation of the battery pack. The handle for transportation may be configured in various forms. Specifically, a portion of the sheathing cover may be depressed or may protrude to form the handle for transportation, or a handle-type member may be mounted at the sheathing cover.

For example, the handle for transportation may include a grip part, at which a handle-type member is mounted, and a coupling part extending to one side of the grip part and mechanically coupled to the base plate.

The external mounting part of the base plate is a structure that is mounted at the external structure. The external mounting part may be configured in various forms. For example, the external mounting part may be configured to have a downwardly bent protruding structure, and the external structure may be provided with a recess or a catching structure, in which the downwardly bent protruding structure of the external mounting part is mounted.

In another example of the external mounting part of the base plate, the base plate may be provided at the bottom surface thereof with one or more mounting brackets, through which the battery pack is mounted to an external device or an external facility. The structure of the mounting brackets is not particularly restricted. That is, the mounting brackets may have various structures. The external facility may be a wall of a building. Consequently, the battery pack may be easily mounted to or separated from the wall.

In accordance with another aspect of the present invention, there is provided a device including the battery pack as a power source. Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
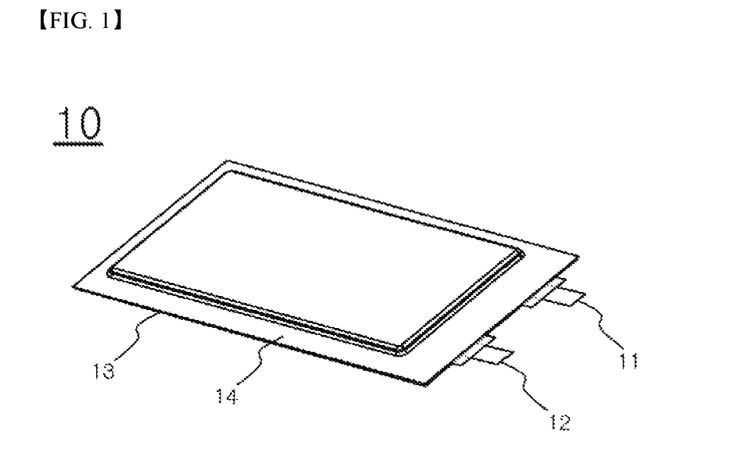
FIG. 1 is a perspective view showing a pouch-shaped battery cell according to the present invention.

FIG. 1 is a perspective view showing a pouch-shaped battery cell constituting a unit cell in a battery pack according to the present invention.

Referring to FIG. 1, a battery cell 10 is a plate-shaped battery cell 10 having electrode terminals (a positive electrode terminal 11 and a negative electrode terminal 12) formed at one end thereof. Specifically, the plate-shaped battery cell 10 is configured to have a structure in which an electrode assembly (not shown) is mounted in a pouch-shaped battery case 13 made of a laminate sheet including a metal layer (not shown) and a resin layer (not shown), and a sealed portion 14 is formed at the battery case 13, for example, by thermal bonding. Generally, the battery cell with the above-stated construction may also be referred to as a pouch-shaped battery cell.

Figure 2:
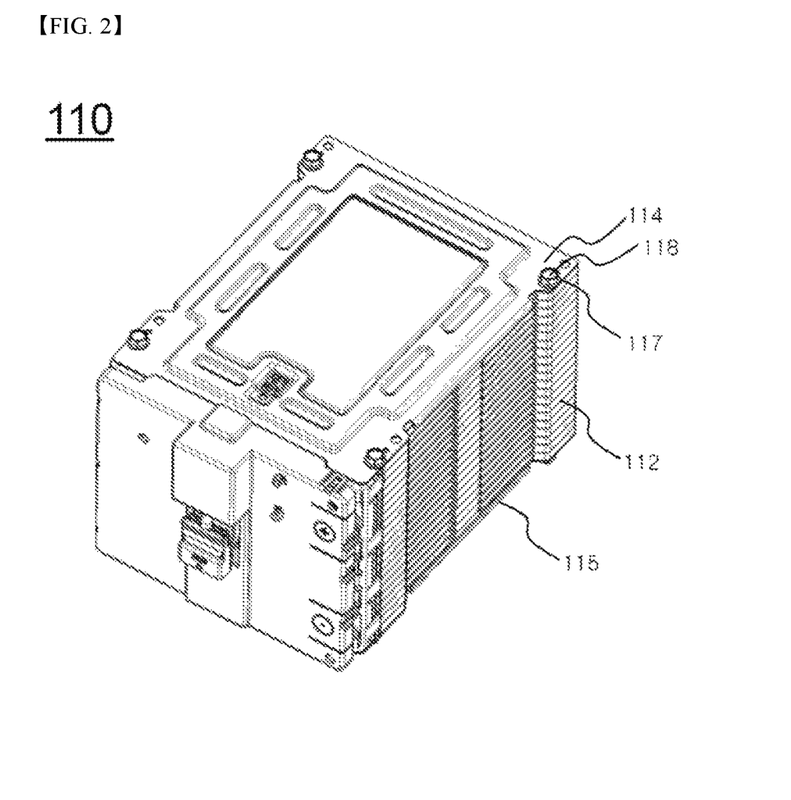
FIG. 2 is a perspective view showing a battery module constituting a module assembly in a battery pack according to the present invention.

FIG. 2 is a perspective view showing a battery module constituting a module assembly in a battery pack according to the present invention.

Referring to FIG. 2 together with FIG. 1, a battery module 110 is configured to have a structure in which a plurality of unit cells 10 is stacked, in a state in which each of the unit cells 10 is mounted to a corresponding cartridge 112, to form a unit cell stack structure, and upper and lower plates 114 and 115 are mounted to the outermost unit cells 10 of the unit cell stack structure for fixing the unit cell stack structure. Each of the cartridges 112 is provided at corners thereof with fastening holes, and each of the upper and lower plates 114 and 115 is provided at corners thereof with fastening holes 117, which correspond to the fastening holes of the cartridges 112.

That is, in a state in which the upper plate 114 and the lower plate 115 are located at the uppermost unit cell 10 and the lowermost unit cell 10 of the unit cell stack structure, respectively, fastening members 118 are inserted through the fastening holes 117 of the upper and lower plates 114 and 115 and the fastening holes of the cartridges 112 such that the unit cell stack structure is fixed between the upper and lower plates 114 and 115.

Figure 3:
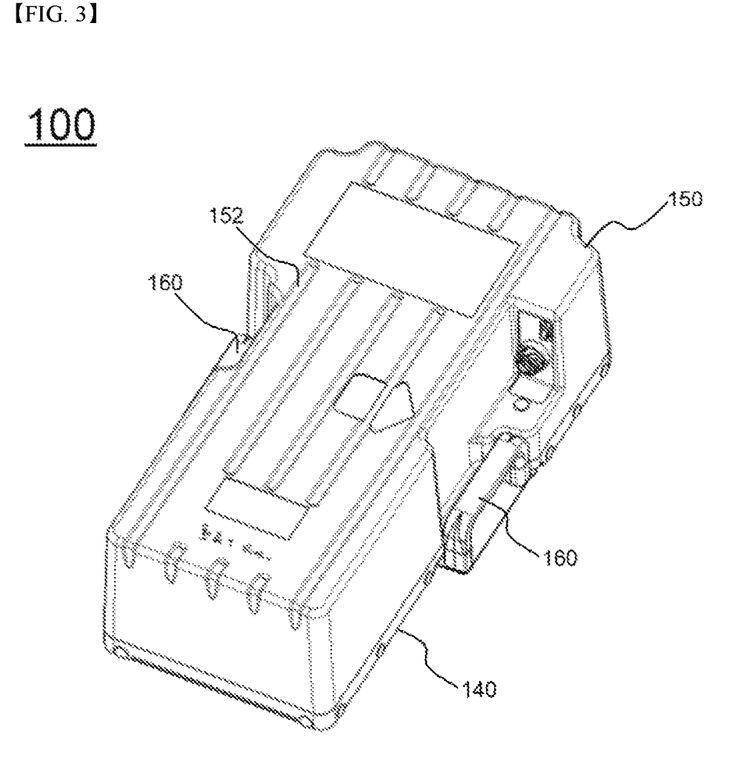
FIG. 3 is a perspective view showing a battery pack according to an embodiment of the present invention.
Figure 4:
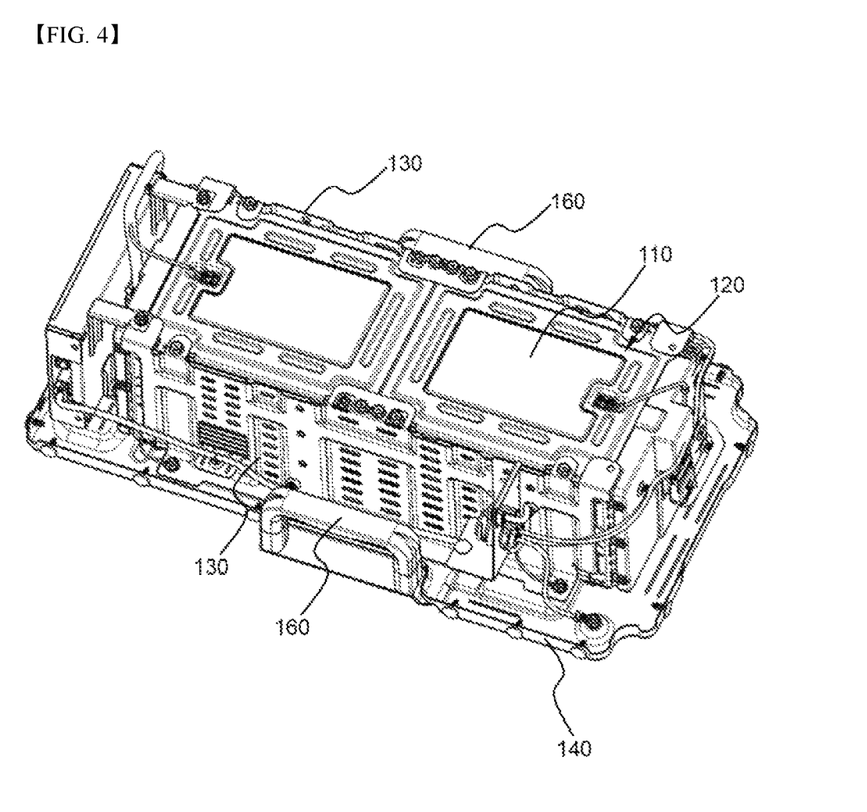
FIG. 4 is a perspective view showing the battery pack with a sheathing cover removed from FIG. 3.

FIG. 3 is a perspective view showing a battery pack according to an embodiment of the present invention, and FIG. 4 is a perspective view showing the battery pack with a sheathing cover removed from FIG. 3.

Referring to FIGS. 3 and 4, a battery pack 100 includes a module assembly 120, side plates 130, a base plate 140, and a sheathing cover 150.

The module assembly 120 is configured to have a structure in which two battery modules 110, each of which is configured to have a structure in which a plurality of unit cells is electrically connected to each other in a state of being stacked, are arranged in a state in which the battery modules are adjacent to each other laterally with respect to a direction in which the unit cells are stacked. The side plates 130 are mounted to opposite sides of the module assembly 120, and are coupled to the base plate 140 while fixing the battery modules 110 of the module assembly 120.

The sheathing cover 150 is configured to have a structure for covering the module assembly 120. The sheathing cover 150 is coupled to the base plate 140. The sheathing cover 150 is provided at the outer surface thereof with a reinforcement bead 152 having a concave and convex structure for improving rigidity of the sheathing cover 150.

The base plate 140 is provided with fastening parts, which are coupled to the side plates 130. In addition, the base plate 140 is provided with an external mounting part, which is mounted to an external structure.

The sheathing cover 150 is provided at opposite sides thereof with handles 160 for transportation, which enable easy transportation of the battery pack.

Figure 5:
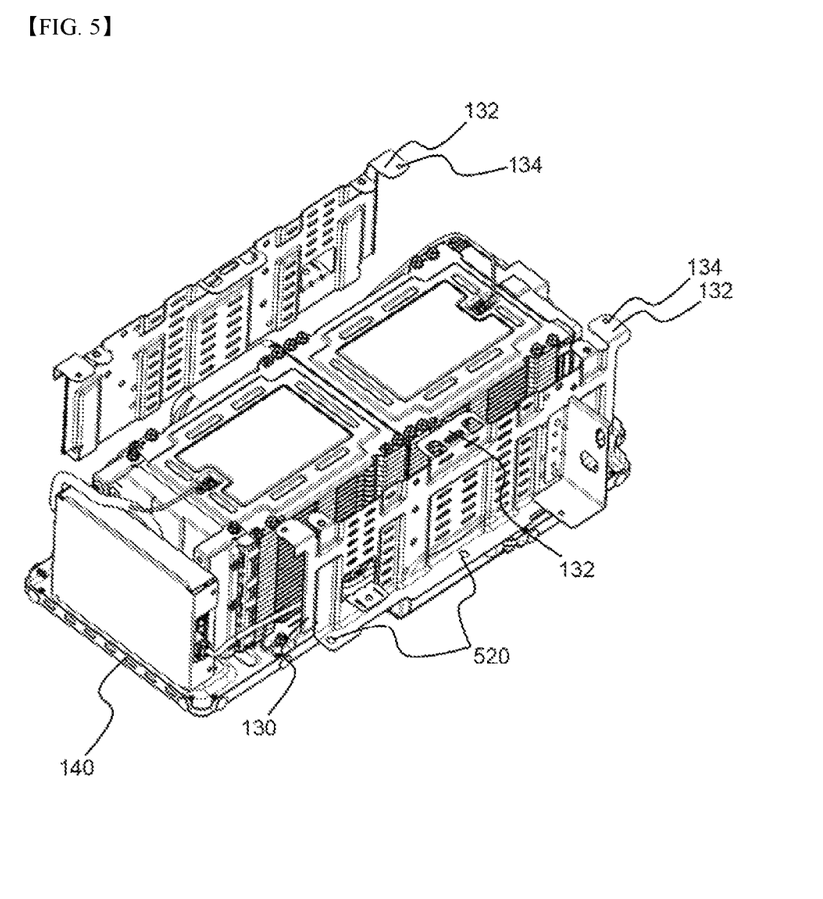
FIG. 5 is a perspective view showing the battery pack with side plates removed from FIG. 4.

FIG. 5 is a perspective view showing the battery pack with the side plates removed from FIG. 4

Referring to FIG. 5, each of the side plates 130 is provided with a plurality of battery module coupling parts 132, which extend from the upper end of each of the side plates 130 and are bent so as to contact the top surfaces of the battery modules 110, for fixing the battery modules 110. Each of the battery module coupling parts 132 is provided with a fastening hole 134, through which each of the battery module coupling parts 132 is coupled to a corresponding upper corner of a corresponding one of the battery modules 110. Bolts or rivets may be coupled to the upper corners of the battery modules 110 through the fastening holes 134 such that the side plates 130 are coupled to the battery modules 110.

In addition, the lower end of each of the side plates 130 is bent so as to contact the base plate 140 in a surface contact fashion such that each of the side plates 130 is coupled to the base plate 140. The bent lower end of each of the side plates 130 is provided with fastening holes 136, through which bolts or rivets are inserted such that each of the side plates 130 is coupled to the base plate 140.

Figure 6:
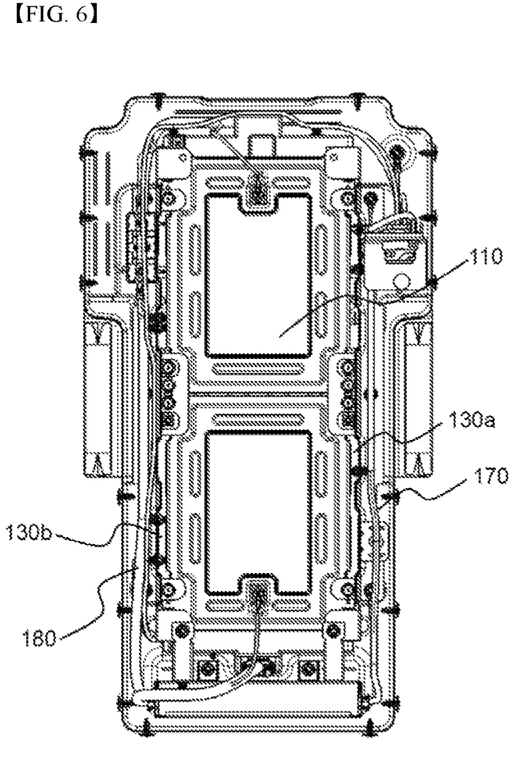
FIG. 6 is a plan view of FIG. 4.
Figure 7:
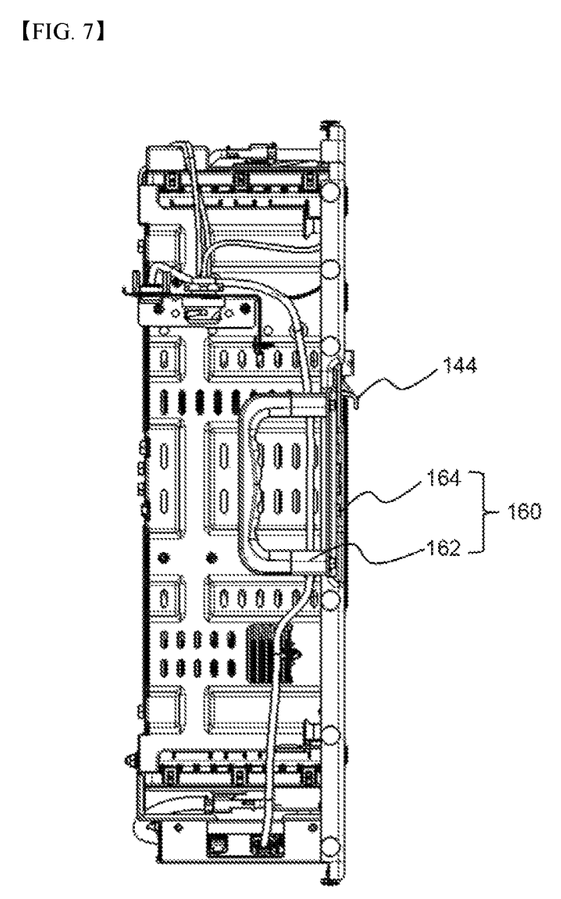
FIG. 7 is a side view of FIG. 4.
Figure 8:
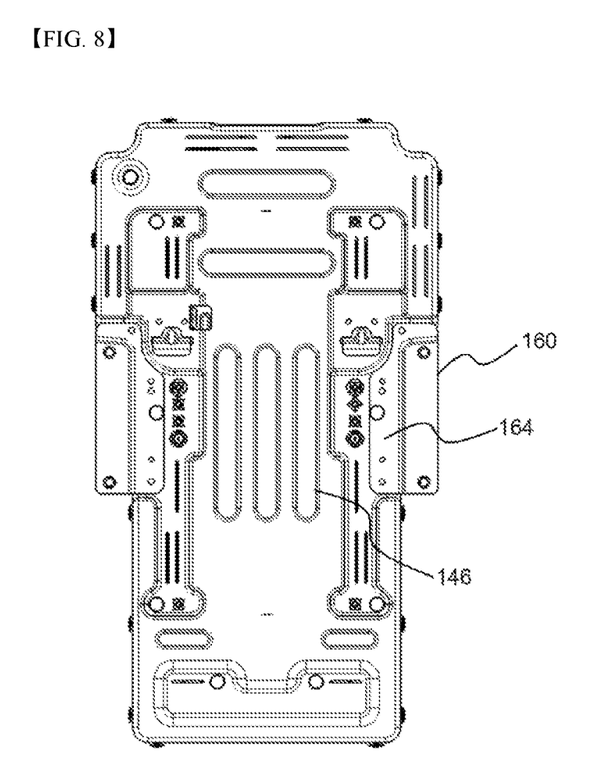
FIG. 8 is a bottom view of FIG. 4.

FIGS. 6 to 8 are a plan view, a side view, and a bottom view of FIG. 4, respectively.

Referring first to FIG. 6, a power wire harness 170 and a communication wire harness 180 are mounted outside the side plates 130, which are coupled to the opposite sides of the module assembly 120. Specifically, the power wire harness 170 is mounted along the outer surface of one side plate 130a, and the communication wire harness 180 is mounted along the outer surface of the other side plate 130b opposite to the side plate 130a at which the power wire harness 170 is mounted. As a result, the power wire harness 170 and the communication wire harness 180 are physically spaced apart from each other, and therefore noise is prevented from being generated in the communication wire harness 180 due to the power wire harness 170.

The power wire harness 170 includes a power line for interconnecting the battery modules 110 and a sensing line for transmitting voltages detected from the battery modules. The communication wire harness 180 connects an inverter, which is connected to an input and output terminal of the battery pack, to a battery management system (BMS), which functions as a controller.

Referring to FIGS. 7 and 8 together with FIG. 6, the handles 160 for transportation, which enable easy transportation of the battery pack 100, are formed at opposite sides of the base plate 140. Each of the handles 160 for transportation includes a grip part 162, at which a handle-type member is mounted, and a coupling part 164, which extends to one side of the grip part 162 and is mechanically coupled to the base plate 140.

The base plate 140 is provided at the bottom surface thereof with an external mounting part 144, which is mounted to an external structure. The external mounting part 144 is configured to have a downwardly bent protruding structure. Although not shown in the figures, the external structure may be provided with a recess or a catching structure, in which the downwardly bent protruding structure of the external mounting part 144 is mounted, such that the external mounting part can be mounted to the external structure.

In addition, the base plate 140 is provided with air holes 146, which communicate with the outside such that heat generated from the battery modules 110 can be discharged to the outside through the air holes 146.

Figure 9:
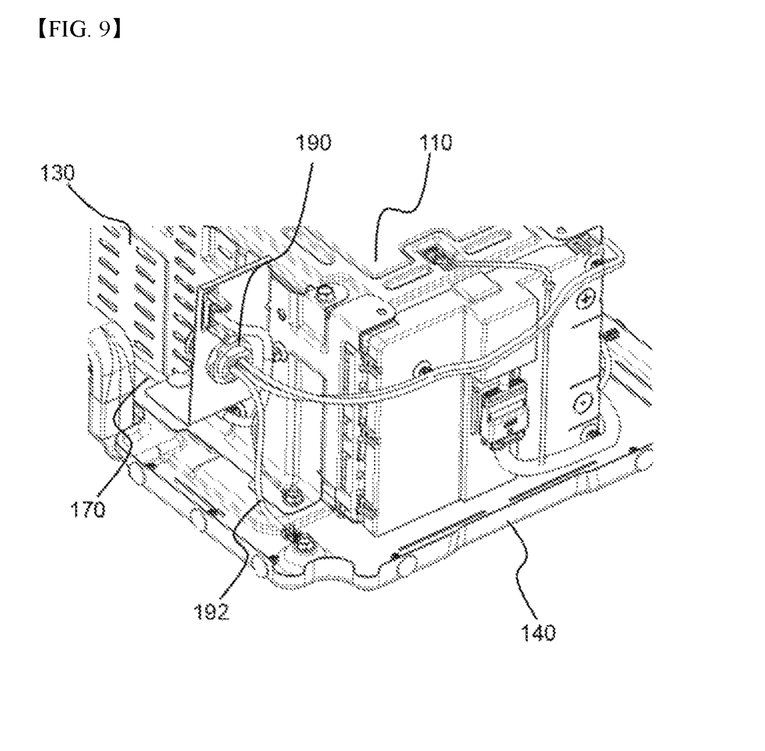
FIG. 9 is an enlarged view showing a ground portion of FIG. 4.

FIG. 9 is an enlarged view showing a ground portion of FIG. 4.

Referring to FIG. 9 together with FIG. 6, a three polar power connector 190, which is connected to a positive electrode, a negative electrode, and a ground wire, is electrically connected to the battery modules 110. The power connector 190 is connected to the end of a power line of the power wire harness 170. The end of the ground wire 192 contacts the base plate 140 for grounding to prevent the occurrence of an electric leakage and to prevent noise from being generated in the communication wire harness 180.

The ground wire 192 is connected to the top surface of the base plate 140 adjacent to the outer surface of the side plate 130 at which the power wire harness 170 is located.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention is configured to have a structure in which a module assembly, constituted by a plurality of battery modules which are coupled to each other, is mounted on a base plate in a state in which side plates are coupled to the module assembly. Consequently, it is possible to stably mount the battery modules in the battery pack and to easily assemble the battery pack.

In addition, the battery pack according to the present invention includes an external mounting part. Consequently, it is possible to easily mount the battery pack to an external structure.

Furthermore, in the battery pack according to the present invention, a power wire harness and a communication wire harness are spaced apart from each other, and a power line of the power wire harness is connected to the base plate. Consequently, it is possible to prevent noise from being generated in the communication wire harness, thereby preventing malfunction of the battery pack and improving safety of the battery pack.

The invention claimed is:

1. A battery pack comprising:
   at least one module assembly having at least two battery modules, each battery module including a plurality of unit cells that is stacked in a state in which the unit cells are electrically connected to each other, the at least two battery modules being arranged such that the battery modules are adjacent to each other in a first direction;
   a pair of side plates covering opposite sides of the module assembly, each side plate extending in the first direction;
   a base plate having fastening parts, which are coupled to the side plates, formed at one surface thereof and an external mounting part, which is mounted to an external structure, formed at the other surface thereof, the base plate having a first section with a first width and a second section with a second width, the first width being smaller than the second width and a flange extending upward from the base plate along edges of the first section and second section;

a sheathing cover coupled to the base plate to cover the module assembly, the sheathing cover having a top wall with a plurality of side edges and side walls integrally connected to and extending from the side edges of the top wall, the side walls extending from the side edges to the base plate to completely cover the pair of side plates; and a handle comprising a coupling part extending laterally from the first section of the base plate and a grip part extending upwardly from the coupling part, and the grip part spaced in a lateral direction from the side walls of the sheathing cover to create a gap between the grip part and the side walls of the sheathing cover.

2. The battery pack according to claim 1, wherein each of the unit cells is a single plate-shaped battery cell or a battery cell assembly in which two or more plate-shaped battery cells are mounted in a cell cover in a state in which electrode terminals are exposed.

3. The battery pack according to claim 2, wherein the plate-shaped battery cell includes an electrode assembly mounted in a battery case made of a laminate sheet comprising a metal layer and a resin layer, and wherein an outer edge of the battery case is sealed.

4. The battery pack according to claim 2, wherein the plate-shaped battery cell is a lithium secondary battery.

5. The battery pack according to claim 1, wherein each of the battery modules includes two or more unit cells that are stacked, in a state in which each of the unit cells is mounted to a corresponding cartridge, to form a unit cell stack structure, and an upper plate and a lower plate are mounted to outermost unit cells of the unit cell stack structure for fixing the unit cell stack structure.

6. The battery pack according to claim 1, wherein each of the side plates is provided with two or more battery module coupling parts, which are bent from an upper end of each of the side plates at a right angle to the side plate so as to overlap and directly contact top surfaces of the battery modules.

7. The battery pack according to claim 6, wherein each of the battery module coupling parts is provided with a fastening hole, through which each of the battery module coupling parts is coupled to a corresponding upper corner of a corresponding one of the battery modules.

8. The battery pack according to claim 1, wherein the module assembly includes two battery modules that are arranged in a state in which the battery modules are adjacent to each other laterally with respect to a direction in which the unit cells are stacked.

9. The battery pack according to claim 1, wherein the battery modules are electrically connected to each other via a power wire harness, a communication wire harness is connected to a controller for controlling operation of the battery pack, and any one selected from the group consisting of the power wire harness and the communication wire harness is mounted along an outer surface of a corresponding one of the side plates.

10. The battery pack according to claim 9, wherein the power wire harness is mounted along the outer surface of one of the side plates, and the communication wire harness is mounted along the outer surface of the other side plate.

11. The battery pack according to claim 10, wherein the power wire harness comprises a power line for interconnecting the battery modules and a sensing line for transmitting voltages detected from the battery modules.

12. The battery pack according to claim 10, wherein a three polar power connector, which is connected to a positive electrode, a negative electrode, and a ground wire, is electrically connected to the battery modules, and an end of the ground wire contacts the base plate for grounding.

13. The battery pack according to claim 12, wherein the ground wire contacts a top surface of the base plate adjacent to an outer surface of the side plate at which the power wire harness is located.

14. The battery pack according to claim 10, wherein the communication wire harness connects an inverter, which is connected to an input and output terminal of the battery pack, to a battery management system (BMS), which functions as the controller.

15. The battery pack according to claim 1, wherein the base plate and/or the sheathing cover is provided with a reinforcement bead having a concave and convex structure.

16. The battery pack according to claim 1, wherein the base plate is provided with an air hole communicating with an outside.

17. The battery pack according to claim 1, wherein the external mounting part has a downwardly bent protruding structure.

18. The battery pack according to claim 1, wherein the base plate is provided at a bottom surface thereof with one or more mounting brackets, through which the battery pack is mounted to an external device or an external facility.

19. The battery pack according to claim 18, wherein the external facility is a wall of a building.

20. The battery pack according to claim 1, wherein the coupling part is attached to a bottom surface of the base plate.

21. The battery pack according to claim 1, wherein the handle is a pair of handles, one of the pair of handles extends from each of opposite sides of the first section of the base plate.

22. A device comprising a battery pack according to claim 1.

23. The device according to claim 22, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

* * * * *